United States Patent
Miura

(10) Patent No.: US 10,020,842 B2
(45) Date of Patent: Jul. 10, 2018

(54) RECEPTION DEVICE AND TRANSMISSION/RECEPTION SYSTEM INCLUDING SAME

(71) Applicant: THINE ELECTRONICS, INC., Tokyo (JP)

(72) Inventor: Satoshi Miura, Tokyo (JP)

(73) Assignee: THINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 15/555,287

(22) PCT Filed: Feb. 18, 2016

(86) PCT No.: PCT/JP2016/054750
§ 371 (c)(1),
(2) Date: Sep. 1, 2017

(87) PCT Pub. No.: WO2016/140075
PCT Pub. Date: Sep. 9, 2016

(65) Prior Publication Data
US 2018/0062701 A1    Mar. 1, 2018

(30) Foreign Application Priority Data

Mar. 4, 2015   (JP) ................. 2015-042053

(51) Int. Cl.
*H04L 25/06*       (2006.01)
*H04B 3/50*        (2006.01)
(Continued)

(52) U.S. Cl.
CPC ................. *H04B 3/50* (2013.01); *H04B 3/02* (2013.01); *H04L 25/0264* (2013.01); *H04L 25/03019* (2013.01)

(58) Field of Classification Search
CPC .......... H04L 25/0272; H04L 25/03019; H04L 25/03; H04L 25/02; H04L 25/0264;
(Continued)

(56) References Cited

U.S. PATENT DOCUMENTS 8,358,708 B2 *  1/2013  Takemoto ................. H03F 3/24
                                                      375/257

FOREIGN PATENT DOCUMENTS

JP    62-123853 A    6/1987
JP    2008-22392 A   1/2008
JP    2009-289125 A  12/2009

OTHER PUBLICATIONS

International Search Report dated Apr. 5, 2016, issued by the International Searching Authority in application No. PCT/JP2016/054750.
(Continued)

*Primary Examiner* — Rahel Guarino
(74) *Attorney, Agent, or Firm* — Sughrue Mion, PLLC

(57) ABSTRACT

The invention relates to a reception device, etc., applied to a transmission/reception system capable of performing high-speed transmission, having a structure to enable to adjust an offset without increasing a circuit area and power consumption. The reception device includes a signal input unit including an offset adjusting circuit, and an adjustment unit. When a pair of adjusting signals of which a voltage between signals is fixed to zero V is outputted from a transmission device to the reception device connected to each other via a differential signal line including at least a pair of signal lines, the signal input unit that has received the pair of adjusting signals outputs logical value data corresponding to the voltage between signals. The adjustment unit determines
(Continued)

adjustment value data to adjust the offset of a threshold to obtain the logical value data based on the logical value data inputted in a certain period.

10 Claims, 2 Drawing Sheets

(51) Int. Cl.
*H04B 3/02* (2006.01)
*H04L 25/03* (2006.01)
*H04L 25/02* (2006.01)

(58) Field of Classification Search
CPC ......... H04L 12/40; H04L 5/1461; H04B 3/50; H04B 3/02; H04B 1/38; G06F 13/4291; G01R 31/318572
See application file for complete search history.

(56) References Cited

OTHER PUBLICATIONS

International Preliminary Report on Patentability with translation of Written Opinion dated Sep. 14, 2017, issued by the International Searching Authority in application No. PCT/JP2016/054750.

* cited by examiner

RECEPTION DEVICE AND TRANSMISSION/RECEPTION SYSTEM INCLUDING SAME

CROSS REFERENCE TO RELATED APPLICATIONS

This application is a National Stage of International Application No. PCT/JP2016/054750 filed Feb. 18, 2016, claiming priority based on Japanese Patent Application No. 2015-042053 filed Mar. 4, 2015, the contents of all of which are incorporated herein by reference in their entirety.

TECHNICAL FIELD

The present invention relates to a reception device and a transmission/reception system including the reception device.

BACKGROUND ART

In a transmission/reception system including a transmission device and a reception device connected to each other via a pair of signal lines included in a differential signal line, a signal input unit of the reception device inputs differential signals transmitted from the transmission device and samples the differential signals at a timing instructed by a clock so as to generate logical value data corresponding to a voltage between signals (corresponding to differential voltage). When high-speed differential transmission is performed by the transmission/reception system, a margin of the differential signal sampling by the signal input unit of the reception device is reduced by attenuating or reflecting the differential signals.

The margin of the differential signal sampling can be increased by adjusting the offset of the signal input unit of the reception device at the time of the differential signal sampling. The offset is, for example, a deviation of a threshold at the time of binary determination (digital value determination) for determining whether the voltage between the signals of the input differential signals is a logical value 1 or a logical value 0. The offset is caused by characteristics variation of each device included in the circuit. However, the offset can be adjusted by devising the circuit of the signal input unit.

In the invention disclosed in Patent Document 1, a pair of signal lines forming a differential signal line is short-circuited at an input end of a reception device, and an offset is detected based on data obtained by differential signal sampling. Then, the offset is adjusted based on the detection result.

CITATION LIST

Patent Literature

Patent Document 1: Japanese Patent No. 5349842

SUMMARY OF INVENTION

Technical Problem

The inventors have found the following problems as a result of examination of a traditional reception device which can be applied to high-speed differential transmission. That is, in the invention disclosed in Patent Document 1, since it is necessary to provide a switch to short-circuit the differential signal line at the input end of the reception device, a load capacity at the input end increases. This adversely affects the high-speed differential transmission. Since a circuit or the like for detecting the offset is required, the circuit area and power consumption of the reception device are large. In addition, when a signal is transmitted from the transmission device in a state where the differential signal line is short-circuited by closing the switch at the input end of the reception device, the signal may be a noise for the reception device.

The present invention has been made to solve the above problems. An object of the present invention is to provide a reception device which is applied to a transmission/reception system capable of performing high-speed transmission and includes a structure to enable to adjust an offset without increasing a circuit area and power consumption and a transmission/reception system including the reception device.

Solution to Problem

A reception device according to the present embodiment is connected to a transmission device via a pair of signal lines included in a differential signal line. The reception device includes a signal input unit, a request output unit, and an adjustment unit.

The signal input unit inputs differential signals transmitted from the transmission device respectively to the two signal lines and generates data by sampling the differential signals at the timing instructed by a clock. Specifically, in the signal input unit, logical value data corresponding to a voltage between signals of the differential signals sampled at the timing instructed by the clock is generated. The signal input unit can adjust the offset at the time of the differential signal sampling. Therefore, the signal input unit includes an offset adjusting circuit for fluctuating an offset of a threshold to obtain the logical value data according to the input adjustment value data.

The request output unit transmits a request signal for requesting the transmission device to transmit the differential signal (adjusting signal) to adjust the offset, to the transmission device via the pair of signal lines included in the differential signal line or the other signal line different from the pair of signal lines. Specifically, the signal for adjusting the offset is a pair of adjusting signals of which the voltage between signals is fixed to zero V (here, referred to as differential signal having differential of zero V).

When the signal input unit inputs the differential signals having the differential of zero V transmitted from the transmission device via the pair of signal lines in response to the request signal transmitted from the request output unit to the transmission device, the adjustment unit adjusts the offset based on data outputted from the signal input unit. Specifically, in a certain period from the time when the differential signals having the differential of zero V (pair of adjusting signals) outputted from the transmission device in response to the request signal is inputted, the adjustment unit inputs the logical value data outputted from the signal input unit at the timing instructed by the clock and outputs, to the offset adjusting circuit of the signal input unit, the adjustment value data determined based on offset information extracted from the inputted logical value data.

In the reception device according to the present embodiment, it is preferable that the adjustment unit adjust the offset so that the data of the logical value 1 and the data of the logical value 0 are outputted from the signal input unit at the frequencies equal to each other by the differential signal sampling when the signal input unit has inputted the differential signals having the differential of zero V transmitted from the transmission device. Specifically, the adjustment unit determines the adjustment value data so that the logical value 1 and the logical value 0 are outputted from the signal input unit at frequencies equal to each other in a certain period as the logical value data outputted from the signal input unit. The differential signals sampled by the signal input unit are a pair of signals having the differentials fixed to zero V (voltage between signals is zero V). However, random noise is superimposed on each of the differential signals. Therefore, if the offset is an ideal value zero, as the logical value data outputted from the signal input unit, the output frequencies of the logical value 0 and the logical value 1 are equal to each other.

The transmission/reception system according to the present embodiment includes the reception device (reception device according to the present embodiment) having the above-described structure and the transmission device. The transmission device includes a request input unit and a signal output unit. Especially, the request output unit inputs a request signal transmitted from the reception device. In response to the request signal inputted by the request input unit, the signal output unit transmits the differential signals having the differentials of zero V to the reception device via the pair of signal lines.

In the transmission/reception system according to the present embodiment, as a signal line for transmitting the request signal from the reception device to the transmission device, it is preferable to use a signal line which is connected to a first reference potential end via a resistor on the side of the transmission device and is connected to a second reference potential end via the switch on the side of the reception device. In this case, the request signal can be transmitted by controlling the opening/closing state of the switch by the reception device. As the signal line for transmitting the request signal from the reception device to the transmission device, a remaining line made when an interval is provided between the differential signal lines for transmitting the differential signals from the transmission device to the reception device may be applied.

Advantageous Effects of Invention

According to the present embodiment, a reception device can be obtained which is applied to a transmission/reception system capable of performing high-speed transmission and includes a structure to enable to adjust an offset without increasing a circuit area and power consumption.

DESCRIPTION OF EMBODIMENTS

Figure 1:
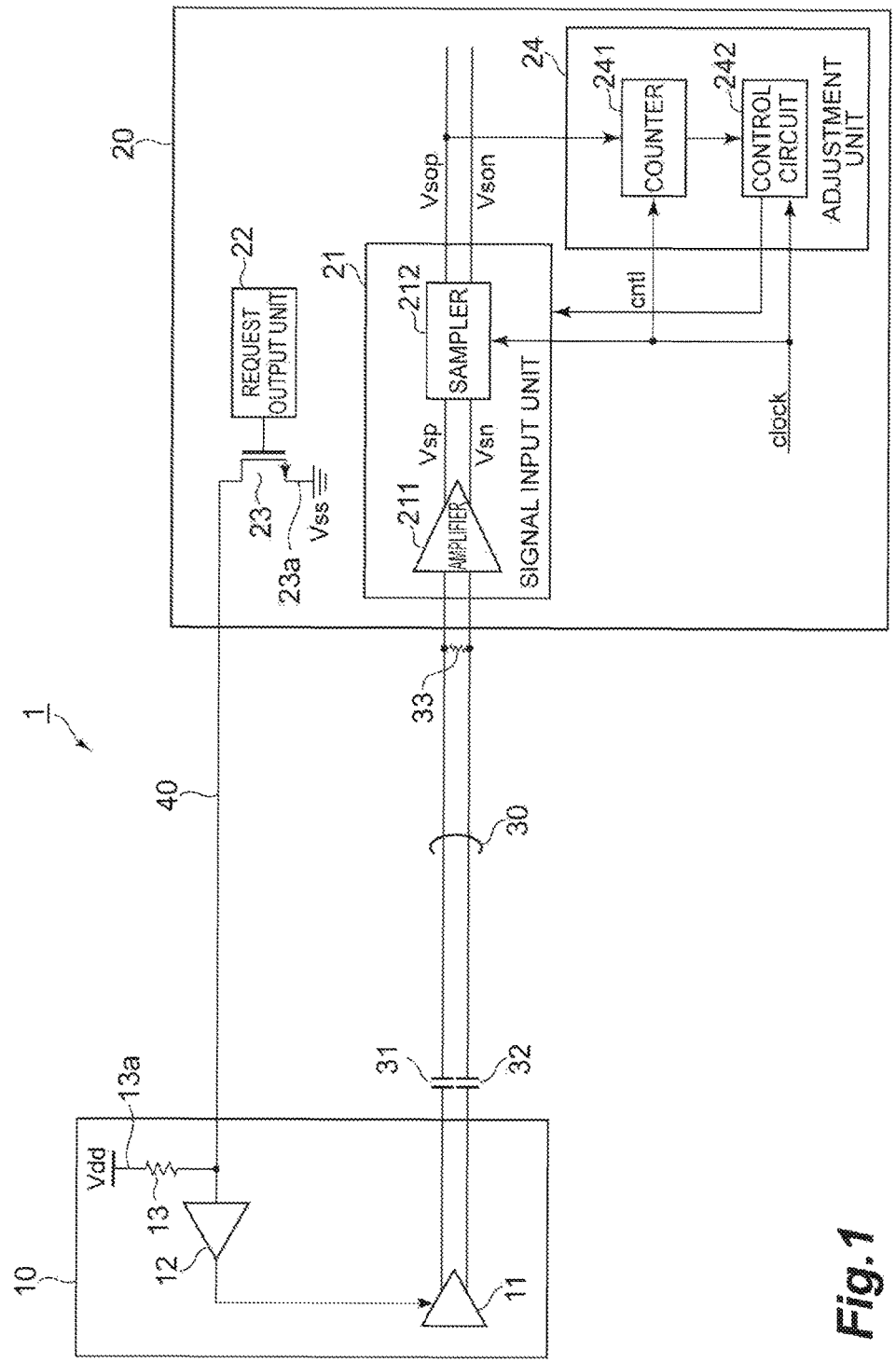
FIG. 1 is a diagram of a structure of a transmission/reception system 1 according to the present embodiment.

An embodiment of the present invention is described in detail below with reference to the attached drawings. In the description on the drawings, the same element is denoted with the same reference numeral, and an overlapped description will be omitted. The present invention is not limited to these examples. It is intended that the present invention includes all the changes within an equivalent meaning and range to the claims indicated in claims.

FIG. 1 is a diagram of a structure of a transmission/reception system 1 according to the present embodiment. The transmission/reception system 1 includes a transmission device 10 and a reception device 20 connected to each other via a differential signal line 30 including a pair of signal lines and a signal line (request signal line) 40 and receives a differential signal transmitted from the transmission device 10 by the reception device 20.

The transmission device 10 includes a signal output unit 11, a request input unit 12, and a resistor 13. The request input unit 12 inputs a request signal transmitted from the reception device 20 via the signal line 40. The resistor 13 is provided between an input end of the request input unit 12 (that is, signal line 40) and a first reference potential end 13a. A power supply potential Vdd is applied to the first reference potential end 13a. The signal output unit 11 transmits the differential signal to the reception device 20 via the differential signal line 30. The signal output unit 11 transmits a differential signal with a differential of zero V to the reception device 20 in response to the request signal inputted by the request input unit 12.

The reception device 20 includes a signal input unit 21, a request output unit 22, a switch 23, and an adjustment unit 24. The signal input unit 21 inputs the differential signal transmitted from the signal output unit 11 of the transmission device 10 via the differential signal line 30 and samples the differential signal at the timing instructed by a clock (symbol: "clock") to generate digital data (binary data of logical value 1 or logical value 0). An offset at the time of the differential signal sampling of the signal input unit 21 can be adjusted.

The signal input unit 21 includes an amplifier 211 for amplifying the differential signal received via the differential signal line 30 and a sampler 212 for sampling differential signals Vsp and Vsn amplified by the amplifier 211 according to the clock "clock" to generate data Vsop and Vson. It is possible that either one of the amplifier 211 and the sampler 212 can adjust the offset.

The data Vsop and the data Vson are digital data respectively having mutually complementary values. When one of them is a logical value 1, the other is a logical value 0. The clock "clock" may be transmitted from the transmission device 10 separately from the data. Furthermore, in a case where the signal transmitted from the transmission device 10 is a signal in which clock information is embedded in the data, the clock "clock" may be a clock restored by the reception device 20 based on the signal.

The request output unit 22 transmits the request signal to the transmission device 10 via the signal line 40. The request signal is a signal for requesting the transmission device 10 to transmit a differential signal to adjust the offset of the signal input unit 21 at the time of the differential signal sampling. The switch 23 is provided between the signal line 40 and a second reference potential end 23a. A ground potential Vss is applied to the second reference potential end 23a.

When the switch 23 is closed, the potential of the signal line 40 is a second reference potential (ground potential Vss). When the switch 23 is opened, the potential of the signal line 40 is a first reference potential (power supply potential Vdd). That is, the request output unit 22 can transmit the request signal to the transmission device 10 based on the opening/closing state of the switch 23. The switch 23 is configured of, for example, a MOS transistor. In this case, the opening/closing state of the switch 23 is set based on a magnitude of a gate voltage.

The structure including the signal line 40, the resistor 13, and the switch 23 is equivalent to a structure for realizing a hot plug detect function. That is, when a cable/connector is disconnected between the transmission device 10 and the reception device 20 or when the reception device 20 is turned off, the potential of the signal line 40 becomes the first reference potential (power supply potential Vdd). When the cable/connector is connected between the transmission device 10 and the reception device 20 and the reception device 20 can be operated, the potential of the signal line 40 becomes the second reference potential (ground potential Vss). By detecting a potential level of the signal line 40, the transmission device 10 can recognize whether the reception device 20 can receive a signal. After confirming that the reception device 20 can receive the signal, the transmission device 10 can transmit a signal to the reception device 20.

The adjustment unit 24 adjusts the offset of the signal input unit 21 at the time of the differential signal sampling based on the data outputted from the signal input unit 21, when the signal input unit 21 inputs the differential signals having differentials of zero V (pair of adjusting signals of which voltage between signals is fixed to zero V) transmitted from the signal output unit 11 of the transmission device 10 in response to the request signal transmitted from the request output unit 22 to the transmission device 10. That is, the adjustment unit 24 inputs the data outputted from the signal input unit 21 output in a certain period from the inputs of the differential signals having the differential of zero V outputted from the transmission device 10 in response to the request signal at the timing instructed by the clock "clock" and outputs adjustment value data determined based on offset information extracted from the input data to an offset adjusting circuit 80 of the signal input unit 21. Preferably, the adjustment unit 24 adjusts the offset so that the data of the logical value 1 and the data of the logical value 0 are outputted at frequencies equal to each other by the differential signal sampling by the signal input unit 21. The voltage between the signals of the differential signal sampled by the signal input unit 21 is zero V (differential of zero V). However, random noise is superimposed on each of the differential signals. Therefore, if the offset is an ideal value zero, the frequencies at which the data Vsop and the data Vson respectively become the logical value 0 and the logical value 1 are equal to each other.

The adjustment unit 24 includes a counter 241 for extracting offset information from output data (logical value data) from the signal input unit 21 and a control circuit 242 for determining adjustment data to adjust the offset of the signal input unit 21 based on the offset information. The counter 241 inputs the clock "clock" together with the data outputted from the signal input unit 21 and counts events that the output data is the logical value 1 or events that the outputs data is the logical value 0 for a certain period. Alternatively, the counter 241 obtains a difference between the number of events that the output data is the logical value 1 and the number of events that the output data is the logical value 0 by increasing the counted value by one when the output data is the logical value 1 and by reducing the counted value by one when the output data is the logical value 0 for a certain period.

The control circuit 242 inputs the count result (offset information) by the counter 241 and the clock "clock" and determines a digital value cntl (adjustment value data) so that the respective data of the logical value 1 and the logical value 0 are outputted at frequencies equal to each other by the differential signal sampling by the signal input unit 21 based on the count result. The control circuit 242 outputs the digital value cntl to the signal input unit 21. The signal input unit 21 adjusts the offset according to the digital value cntl.

The differential signal line 30 transmits the differential signals transmitted from the signal output unit 11 of the transmission device 10 to the signal input unit 21 of the reception device 20. A resistor 33 is provided between the pair of signal lines included in the differential signal line 30.

In a case where the transmission device 10 and the reception device 20 are AC-coupled to each other, capacitors 31 and 32 are respectively inserted into the two signal lines included in the differential signal line 30. In a case of the AC coupling, the transmission device 10 can make the voltage between the signals of the differential signal reaching the signal input unit 21 of the reception device 20 be zero V by respectively outputting constant voltage values to the two signal lines included in the differential signal line 30.

In a case where the transmission device 10 and the reception device 20 are DC-coupled to each other, the capacitors 31 and 32 are unnecessary. In a case of the DC coupling, the transmission device 10 can make the voltage between the signals of the differential signal reaching the signal input unit 21 of the reception device 20 be zero V by respectively outputting the same voltage values to the two signal lines included in the differential signal line 30.

The signal line 40 transmits the request signal from the request output unit 22 of the reception device 20 to the request input unit 12 of the transmission device 10. Since it is not necessary for the request signal transmitted through the signal line 40 to be transmitted at high speed, an inexpensive low-speed line can be used as the signal line 40. In a case where a line having a high signal interference and a poor cable quality such as a flat cable is used between the transmission device 10 and the reception device 20, a remaining line made when an interval is provided between the differential signal lines 30 can be used as the signal line 40.

Figure 2:
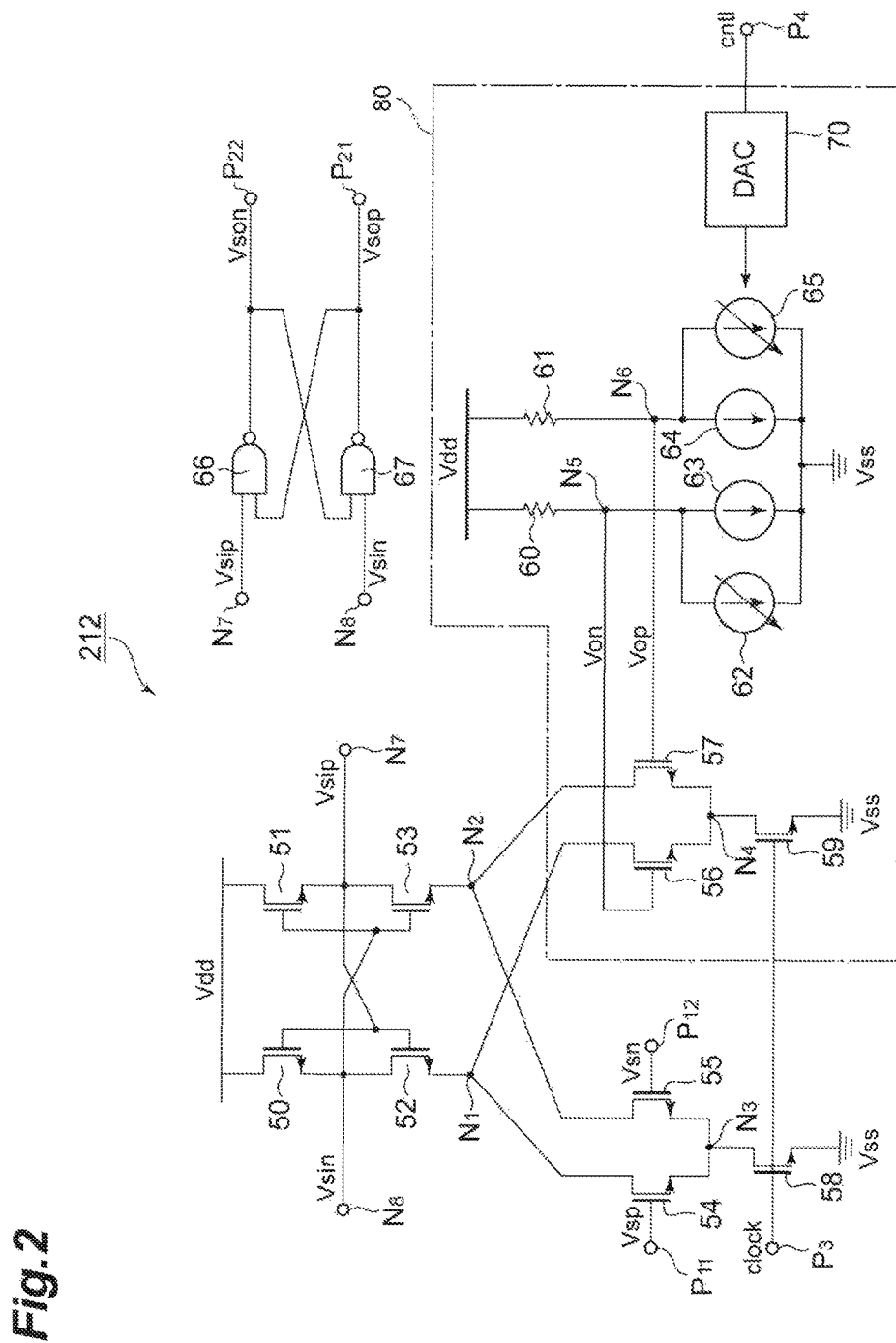
FIG. 2 is a diagram of an exemplary circuit of a sampler 212 capable of adjusting an offset.

FIG. 2 is a diagram of an exemplary circuit of the sampler 212 capable of adjusting the offset. The sampler 212 includes NMOS transistors 50 to 59, resistors 60 and 61, current sources 62 to 65, NAND circuits 66 and 67, and a D/A converter (DAC) 70. The offset adjusting circuit 80 to fluctuate the offset includes the NMOS transistors 56, 57, and 59, the resistors 60 and 61, and the current sources 62 to 65. The sampler 212 includes a first input end $P_{11}$ for inputting the signal Vsp outputted from the amplifier 211, a second input end $P_{12}$ for inputting the signal Vsn outputted from the amplifier 211, a first output end $P_{21}$ for outputting the data Vsop, a second output end $P_{22}$ for outputting the data Vson, a clock input end $P_3$ for inputting the clock, a digital value input end $P_4$ for inputting the digital value cntl outputted from the control circuit 242, a first internal node $N_1$, a second internal node $N_2$, a third internal node $N_3$, a fourth internal node $N_4$, a fifth internal node $N_5$, a sixth internal node $N_6$, a seventh internal node $N_7$, and an eighth internal node $N_8$.

The power supply potential Vdd is applied to a drain of the NMOS transistor 50, a source of the NMOS transistor 50 is connected to the eighth internal node $N_8$, and a gate of the NMOS transistor 50 is connected to the seventh internal node $N_7$. The power supply potential Vdd is applied to a drain of the NMOS transistor 51, a source of the NMOS transistor 51 is connected to the seventh internal node $N_7$, and a gate of the NMOS transistor 51 is connected to the eighth internal node $N_8$.

A drain of the NMOS transistor 52 is connected to the eighth internal node $N_8$, a source of the NMOS transistor 52 is connected to the first internal node $N_1$, and a gate of the NMOS transistor 52 is connected to the seventh internal node $N_7$. A drain of the NMOS transistor 53 is connected to the seventh internal node $N_7$, a source of the NMOS transistor 53 is connected to the second internal node $N_2$, and a gate of the NMOS transistor 53 is connected to the eighth internal node $N_8$.

A drain of the NMOS transistor 54 is connected to the first internal node $N_1$, a source of the NMOS transistor 54 is connected to the third internal node $N_3$, and a gate of the NMOS transistor 54 is connected to the first input end $P_{11}$. A drain of the NMOS transistor 55 is connected to the second internal node $N_2$, a source of the NMOS transistor 55 is connected to the third internal node $N_3$, and a gate of the NMOS transistor 55 is connected to the second input end $P_{12}$.

A drain of the NMOS transistor 56 is connected to the first internal node $N_1$, a source of the NMOS transistor 56 is connected to the fourth internal node $N_4$, and a gate of the NMOS transistor 56 is connected to the fifth internal node $N_5$. A drain of the NMOS transistor 57 is connected to the second internal node $N_2$, a source of the NMOS transistor 57 is connected to the fourth internal node $N_4$, and a gate of the NMOS transistor 57 is connected to the sixth internal node $N_6$.

A drain of the NMOS transistor 58 is connected to the third internal node $N_3$, the ground potential Vss is applied to a source of the NMOS transistor 58, and a gate of the NMOS transistor 58 is connected to the clock input end $P_3$. A drain of the NMOS transistor 59 is connected to the fourth internal node $N_4$, the ground potential Vss is applied to a source of the NMOS transistor 59, and a gate of the NMOS transistor 59 is connected to the clock input end $P_3$.

The resistor 60 is provided between a power supply potential end and the fifth internal node $N_5$. The resistor 61 is provided between the power supply potential end and the sixth internal node $N_6$. The current sources 62 and 63 are provided in parallel between the fifth internal node $N_5$ and a ground potential end. The current sources 64 and 65 are provided in parallel between the sixth internal node $N_6$ and the ground potential end. The current sources 63 and 64 supply a constant current. The current sources 62 and 65 are connected to the digital value input end $P_4$ via the D/A converter 70, and supply a current having an amount corresponding to the digital value cntl input to the digital value input end $P_4$.

One input terminal of the NAND circuit 66 is connected to the seventh internal node $N_7$, the other input terminal of the NAND circuit 66 is connected to the first output end $P_{21}$, and an output terminal of the NAND circuit 66 is connected to the second output end $P_{22}$. One input terminal of the NAND circuit 67 is connected to the eighth internal node $N_8$, the other input terminal of the NAND circuit 67 is connected to the second output end $P_{22}$, and an output terminal of the NAND circuit 67 is connected to the first output end $P_{21}$.

In the offset adjusting circuit 80 of the sampler 212 configured as described above, the current sources 62 and 65 supply the currents corresponding to the digital value cntl input to the digital value input end $P_4$ so that the potential Von of the fifth internal node $N_5$ and the potential Vop of the sixth internal node $N_6$ correspond to the digital value cntl. The potential Von of the fifth internal node $N_5$ is applied to the gate of the NMOS transistor 56. The potential Vop of the sixth internal node $N_6$ is applied to the gate of the NMOS transistor 57.

At the timing of the rising edge of the clock "clock" input to the clock input end $P_3$, the differential signals Vsp and Vsn respectively inputted to the input ends $P_{11}$ and $P_{12}$ are sampled, and the data Vsop and the data Vson are outputted from the output ends $P_{21}$ and $P_{22}$. At the time of sampling, the potential difference between the differential signals Vsp and Vsn becomes uneven due to the potential difference between the potentials Vop and Von. The amount of the bias is proportional to the offset. Therefore, the offset can be adjusted by adjusting the potential difference between the potentials Vop and Von based on the digital value cntl.

An exemplary operation of the transmission/reception system 1 according to the present embodiment is as follows. When the reception device 20 is turned on or woken up, the request output unit 22 transmits the request signal to the transmission device 10 by opening the switch 23 and setting the potential of the signal line 40 to the first reference potential (power supply potential Vdd). The request input unit 12 of the transmission device 10 detects that the potential of the signal line 40 has reached the first reference potential (power supply potential Vdd) and recognizes that the request signal has been transmitted from the reception device 20. The signal output unit 11 of the transmission device 10 transmits the differential signals each having the differential of zero V (adjusting signal of which voltage between signals is fixed to zero V) to the reception device 20.

The signal input unit 21 of the reception device 20 which has received the differential signals having the differential of zero V generates the data Vsop and Vson by sampling the differential signals at the timing instructed by the clock "clock". At this time, although the voltage between the signals of the differential signals sampled by the signal input unit 21 is zero V (differential is zero V), random noises are superimposed on each signal. Therefore, if the offset is an ideal value zero, the frequencies at which the data Vsop and the data Vson respectively become the logical value 0 and the logical value 1 are equal to each other. Therefore, the adjustment unit 24 optimally adjusts the offset of the signal input unit 21 by setting the digital value cntl to be applied to the signal input unit 21 so that the data having the logical value 1 and the data having the logical value 0 outputted from the signal input unit 21 are outputted at frequencies equal to each other.

When the offset adjustment is completed, the adjustment unit 24 stores the digital value cntl at the time of optimal adjustment, and supplies the stored digital value cntl to the signal input unit 21 in the following processing. Furthermore, the request output unit 22 closes the switch 23 and sets the potential of the signal line 40 to the second reference potential (ground potential Vss) so as to notify the transmission device 10 of the completion of the offset adjustment. Upon receipt of the notification, the signal output unit 11 of the transmission device 10 transmits normal data as a differential signal to the reception device 20 in the following processing.

As described above, in the present embodiment, after the request signal has been transmitted from the request output unit 22 of the reception device 20 to the request input unit 12 of the transmission device 10, the signal output unit 11 of the transmission device 10 transmits the differential signals having the differential of zero V to the signal input unit 21 of the reception device 20, and the adjustment unit 24 adjusts the offset of the signal input unit 21 to which the differential signals having the differential of zero V have been inputted. At this time, the offset of the whole signal input unit 21 including the amplifier 211 and the sampler 212 is adjusted.

In the reception device 20 according the present embodiment, since the adjustment unit 24 can be formed of a digital circuit, the circuit area and the power consumption can be reduced than those in the structure according to the invention disclosed in Patent Document 1. In the invention disclosed in Patent Document 1, it is necessary to provide a switch for short-circuiting a pair of signal lines included in a differential signal line at an input end of a reception device. Whereas, since the reception device 20 according to the present embodiment does not need the switch, high-speed differential transmission can be performed by adjusting the offset without increasing a load capacity at the input end.

Furthermore, in the present embodiment, since the signal line 40 for transmitting the request signal from the request output unit 22 of the reception device 20 to the request input unit 12 of the transmission device 10 is used in common to the signal line for hot plug detection, it is not necessary to additionally provide a new signal line between the transmission device 10 and the reception device 20. In addition, it is not necessary to additionally provide a circuit to transmit/receive the request signal or the size of the circuit may be small.

REFERENCE SIGNS LIST

1: Transmission/reception system; 10: Transmission device; 11: Signal output unit; 12: Request input unit; 13: Resistor; 20: Reception device 21: Signal input unit; 22: Request output unit; 23: Switch; 24: Adjustment unit; 30: Differential signal line; 31, 32: Capacitor, 33: Resistor, 40: Signal line; 70: D/A converter (DAC); 80: Offset adjusting circuit; 211: Amplifier; 212: Sampler; 241: Counter; and 242: Control circuit.

The invention claimed is:

1. A reception device comprising:
a signal input unit including an offset adjusting circuit configured to input differential signals transmitted from a transmission device via a pair of signal lines included in a differential signal line, output logical value data corresponding to a voltage between signals of the differential signals sampled at a timing instructed by a clock, and fluctuate an offset of a threshold to obtain the logical value data according to input adjustment value data;
a request output unit configured to transmit, to the transmission device, a request signal for requesting to transmit a pair of adjusting signals of which the voltage between signals is fixed to zero V to the pair of signal lines, to adjust the offset; and
an adjustment unit configured to input, at the timing instructed by the clock, the logical value data outputted from the signal input unit in a certain period from the time of input of the pair of adjusting signals outputted from the transmission device in response to the request signal, and output, to the offset adjusting circuit of the signal input unit, the adjustment value data determined based on offset information extracted from the inputted logical value data.

2. The reception device according to claim 1, wherein the adjustment unit determines the adjustment value data so that a logical value 1 and a logical value 0 are outputted from the signal input unit as the logical value data in the certain period at frequencies equal to each other.

3. A transmission/reception system comprising:
the reception device according to claim 1; and
a transmission device including a request input unit configured to input the request signal transmitted from the reception device and a signal output unit configured to transmit, to the pair of signal lines, the pair of adjusting signals of which the voltage between signals is fixed to zero V respectively in response to the request signal inputted by the request input unit.

4. The transmission/reception system according to claim 3, further comprising a signal line connected to a first reference potential end via a resistor on the side of the transmission device, and a second reference potential end via a switch on the side of the reception device, as a signal line for transmitting the request signal from the reception device to the transmission device,
wherein the request output unit transmits the request signal to the transmission device by controlling an opening/closing state of the switch.

5. The transmission/reception system according to claim 3, wherein a remaining line made when an interval is provided between differential signal lines for respectively transmitting the differential signals from the transmission device to the reception device, is used as a signal line for transmitting the request signal from the reception device to the transmission device.

6. The transmission/reception system according to claim 4, wherein a remaining line made when an interval is provided between differential signal lines for respectively transmitting the differential signals from the transmission device to the reception device, is used as a signal line for transmitting the request signal from the reception device to the transmission device.

7. A transmission/reception system comprising:
the reception device according to claim 2; and
a transmission device including a request input unit configured to input the request signal transmitted from the reception device and a signal output unit configured to transmit, to the pair of signal lines, the pair of adjusting signals of which the voltage between signals is fixed to zero V respectively in response to the request signal inputted by the request input unit.

8. The transmission/reception system according to claim 7, further comprising a signal line connected to a first reference potential end via a resistor on the side of the transmission device, and a second reference potential end via a switch on the side of the reception device, as a signal line for transmitting the request signal from the reception device to the transmission device,
wherein the request output unit transmits the request signal to the transmission device by controlling an opening/closing state of the switch.

9. The transmission/reception system according to claim 7, wherein a remaining line made when an interval is provided between differential signal lines for respectively transmitting the differential signals from the transmission device to the reception device, is used as a signal line for transmitting the request signal from the reception device to the transmission device.

10. The transmission/reception system according to claim 8, wherein a remaining line made when an interval is provided between differential signal lines for respectively transmitting the differential signals from the transmission device to the reception device, is used as a signal line for transmitting the request signal from the reception device to the transmission device.

* * * * *